United States Patent
De Villele et al.

(10) Patent No.: US 11,113,978 B2
(45) Date of Patent: Sep. 7, 2021

(54) SYSTEM AND METHOD FOR DETERMINING AND DISPLAYING OPTIMIZED AIRCRAFT ENERGY LEVEL

(71) Applicant: HONEYWELL INTERNATIONAL INC., Morris Plains, NJ (US)

(72) Inventors: Dorothee De Villele, Haute-Garonne (FR); Erwan Paricaud, Haute Garonne (FR); Daniel Corbel, Haute-Garonne (FR); Michal Polansky, South Moravia (CZ); Zdenek Jancik, Vysocina (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 542 days.

(21) Appl. No.: 15/265,330

(22) Filed: Sep. 14, 2016

(65) Prior Publication Data

US 2018/0075761 A1 Mar. 15, 2018

(51) Int. Cl.
| | |
|---|---|
| *G08G 5/02* | (2006.01) |
| *B64D 43/02* | (2006.01) |
| *G01C 23/00* | (2006.01) |
| *G08G 5/00* | (2006.01) |
| *B64D 45/08* | (2006.01) |

(52) U.S. Cl.
CPC ............ *G08G 5/02* (2013.01); *B64D 43/02* (2013.01); *B64D 45/08* (2013.01); *G01C 23/00* (2013.01); *G01C 23/005* (2013.01); *G08G 5/0021* (2013.01); *G08G 5/025* (2013.01)

(58) Field of Classification Search
CPC combination set(s) only.
See application file for complete search history.

(56) References Cited

U.S. PATENT DOCUMENTS

| | | |
|---|---|---|
| 4,127,249 A | 11/1978 | Lambregts |
| 4,750,127 A | 6/1988 | Leslie et al. |
| 5,608,392 A | 3/1997 | Faivre et al. |

(Continued)

FOREIGN PATENT DOCUMENTS

WO WO2106191320 A1 * 5/2016 ............. G01C 21/00

OTHER PUBLICATIONS

Extended EP Search Report for Application No. 17190225.7 dated May 24, 2018.

(Continued)

*Primary Examiner* — Nabil H Syed
*Assistant Examiner* — Cal J Eustaquio
(74) *Attorney, Agent, or Firm* — Lorenz & Kopf, LLP

(57) ABSTRACT

A system and method of displaying optimized aircraft energy level to a flight crew includes processing flight plan data, in a processor, to determine the optimized aircraft energy level along a descent profile of the aircraft from cruise altitude down to aircraft destination, and continuously processing aircraft data, in the processor, to continuously determine, in real-time, an actual aircraft energy level. The actual aircraft energy level of the aircraft is continuously compared, in the processor, to the optimized aircraft energy level. The processor is use to command a display device to render an image that indicates: (i) the optimized aircraft energy level, (ii) how the actual aircraft energy level differs from the optimized aircraft energy level, and (iii) how the actual aircraft energy level is trending relative to the optimized aircraft energy level.

20 Claims, 7 Drawing Sheets

(56) References Cited

U.S. PATENT DOCUMENTS

| | | | |
|---|---|---|---|
| 6,062,513 | A | 5/2000 | Lambregts |
| 7,440,825 | B2 | 10/2008 | Einthoven et al. |
| 7,647,140 | B2 | 1/2010 | Demortier et al. |
| 8,184,020 | B2 | 5/2012 | He |
| 8,290,639 | B2 | 10/2012 | Westphal et al. |
| 8,527,173 | B2 | 9/2013 | Lacoste et al. |
| 8,706,324 | B2 | 4/2014 | Barral et al. |
| 8,774,989 | B1 | 7/2014 | Bush et al. |
| 8,781,654 | B2 | 7/2014 | Giovannini et al. |
| 8,825,238 | B2 | 9/2014 | Peptione et al. |
| 8,948,937 | B2 | 2/2015 | Constans et al. |
| 2010/0036552 | A1* | 2/2010 | Pepitone ............... G05D 1/0676 701/18 |
| 2010/0079308 | A1 | 4/2010 | Fabre et al. |
| 2012/0277936 | A1 | 11/2012 | Kumar MN et al. |
| 2013/0190949 | A1 | 7/2013 | Constans et al. |
| 2013/0197724 | A1* | 8/2013 | Ellis ....................... B64D 43/00 701/6 |
| 2015/0277441 | A1 | 10/2015 | Garrido-Lopez |
| 2016/0004255 | A1* | 1/2016 | Moxon ................ G05D 1/0055 701/7 |
| 2016/0063867 | A1* | 3/2016 | Zammit ............... G08G 5/0039 701/18 |
| 2016/0090193 | A1 | 3/2016 | He et al. |

OTHER PUBLICATIONS

Catton, Lewis et al., Designinig Energy Display Formats for Civil Aircraft: Reply to Amelink, Mulder, van Paassen and Flach, The International Journal of Aviation Psychology, 17(1), Jan. 2007, p. 31-40.

Amelink, Matthijs, et al., "Theoretical Foundations for a Total Energy-Based Perspective Flight-Path Display," The Inernational Journal of Aviation Psychology, 15(3), Jan. 2005, p. 205-231.

Partial EP Search Report for Application No. 17190225.7 dated Jan. 31, 2018.

\* cited by examiner

SYSTEM AND METHOD FOR DETERMINING AND DISPLAYING OPTIMIZED AIRCRAFT ENERGY LEVEL

TECHNICAL FIELD

The present invention generally relates to aircraft display systems and methods, and more particularly relates to systems and methods for determining and displaying optimized aircraft energy level.

BACKGROUND

A continuous descent approach (CDA), which is also known as an optimized profile descent (OPD), is a particular method of aircraft airport approach prior to landing. A continuous descent approach starts from the top of descent, i.e. at cruise altitude, and allows the aircraft to fly its optimal vertical profile down to runway threshold. That is, instead of approaching an airport in a staggered altitude (or stair-step) fashion, a continuous descent approach allows the aircraft to descend at a smooth, relatively constant-angle of descent to landing. The goals of a continuous descent approach are reduced fuel consumption and reduced noise as compared to known conventional descents.

Unfortunately, many aircraft do not provide any type of visual cues to the flight crew regarding when to appropriately extend airbrakes or configure the aircraft in order to cope with off-path or off-speed situations and thereby recover the aircraft to its optimized descent flightpath during a continuous descent approach. Some aircraft include midterm awareness cues that are based on predicted aircraft states, but only cover above-path or above-speed situations. There is presently no means of providing visual cues that cover mixed, off-nominal situations, such as an above-path/under-speed situation.

Hence, there is a need for a system and method of determining aircraft optimal energy level during a descent from cruise altitude down to final destination and providing an image to the flight crew that clearly indicates when the actual aircraft energy level deviates from the optimal aircraft energy level. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of displaying optimized aircraft energy level to a flight crew includes processing flight plan data, in a processor, to determine the optimized aircraft energy level along a descent profile of the aircraft from cruise altitude down to aircraft destination, and continuously processing aircraft data, in the processor, to continuously determine, in real-time, an actual aircraft energy level. The actual aircraft energy level of the aircraft is continuously compared, in the processor, to the optimized aircraft energy level. The processor is use to command a display device to render an image that indicates: (i) the optimized aircraft energy level, (ii) how the actual aircraft energy level differs from the optimized aircraft energy level, and (iii) how the actual aircraft energy level is trending relative to the optimized aircraft energy level.

In another embodiment, a system for displaying optimized aircraft energy level to a flight crew includes a display device and a processor. The display device is coupled to receive image rendering display commands and is configured, upon receipt thereof, to render various images. The processor is coupled to receive flight plan data and aircraft data and is configured to: process the flight plan data to determine the optimized aircraft energy level along a descent profile of the aircraft from cruise altitude down to aircraft destination, continuously process the aircraft data to continuously determine, in real-time, an actual aircraft energy level, and continuously compare the actual aircraft energy level of the aircraft to the optimized aircraft energy level. The processor is also configured to supply image rendering display commands to the display device that cause the display device to render an image that indicates (i) the optimized aircraft energy level, (ii) how the actual aircraft energy level differs from the optimized aircraft energy level, and (iii) how the actual aircraft energy level is trending relative to the optimized aircraft energy level.

In yet another embodiment, a system for displaying optimized aircraft energy level to a flight crew includes an aircraft speed sensor, an altitude sensor, a display device, and a processor. The aircraft speed sensor is configured to sense aircraft speed and supply an aircraft speed signal representative thereof. The aircraft altitude sensor is configured to sense aircraft altitude and supply an aircraft altitude signal representative thereof. The display device is coupled to receive image rendering display commands and is configured, upon receipt thereof, to render various images. The processor is coupled to receive flight plan data, the aircraft speed signal, and the aircraft altitude signal, and is configured to: process the flight plan data to determine the optimized aircraft energy level along a descent profile of the aircraft from cruise altitude down to aircraft destination, continuously process the sensed aircraft speed to determine the actual aircraft kinetic energy level, continuously process the sensed aircraft altitude to determine the actual aircraft potential energy level continuously compare the actual aircraft energy level of the aircraft to the optimized aircraft energy level, and continuously sum the actual aircraft kinetic energy level and the actual aircraft potential energy level to determine the actual aircraft energy level. The processor is also configured to supply image rendering display commands to the display device that cause the display device to render an image that indicates (i) the optimized aircraft energy level, (ii) how the actual aircraft energy level differs from the optimized aircraft energy level, and (iii) how the actual aircraft energy level is trending relative to the optimized aircraft energy level, and render one or more visual cues that indicate actions the flight crew could take to converge the actual aircraft energy level toward the optimized aircraft energy level.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
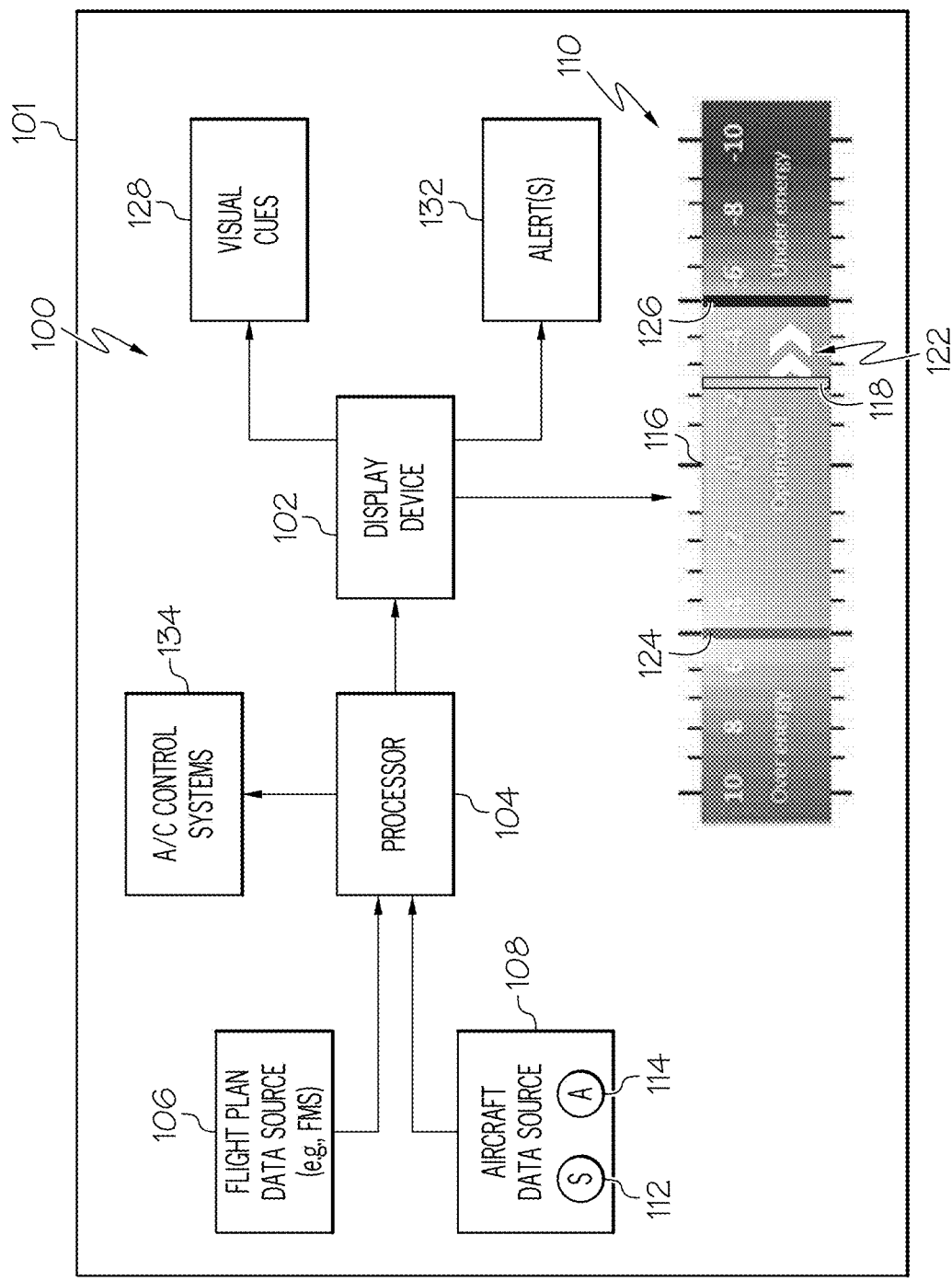
FIG. 1 depicts a functional block diagram of a display system that may be used for displaying optimized aircraft energy level to a flight crew.

Referring to FIG. 1, a functional block diagram of a display system 100 that may be used for displaying optimized aircraft energy level to a flight crew is depicted. This system 100, which is preferably disposed in an aircraft 101, includes, at least in the depicted embodiment, a display device 102 and a processor 104. The display device 102 is in operable communication with the processor 104, and is responsive to image rendering display commands supplied by the processor 104 to render various images and data, in a graphic, iconic, and a textual format, and to supply visual feedback to a non-illustrated user. It will be appreciated that the display device 102 may be implemented using any one of numerous known displays suitable for rendering graphic, iconic, and/or text data in a format viewable by a user. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, the display device 106 includes a panel display. It is further noted that the system 100 could be implemented with more than one display device 102. For example, the system 100 could be implemented with two or more display devices 102.

No matter the number or particular type of display that is used to implement the display device 102, it was noted above that the display device 102 is responsive to the image rendering display commands it receives to render various images. The images that the display device 102 renders will depend, for example, on the type of display being implemented. For example, the display device 102 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the system 100 may be implemented with multiple display devices 102, each of which may implement one or more of these different, non-limiting displays. The display device 102 may also be implemented in an electronic flight bag (EFB) and, in some instance, some or all of the system 100 may be implemented in an EFB. One particular image 110 that the display device 102 renders is depicted in FIG. 1, and will be described in more detail further below.

The processor 104, as noted above, is in operable communication with the display device 102. As FIG. 1 further depicts, the processor 104, at least in the depicted embodiment, is also in operable communication with a flight plan data source 106 and an aircraft data source 108. The processor 104 is coupled to receive flight plan data from the flight plan data source 106 and is configured, upon receipt of these data, to determine the optimized aircraft energy level along a descent profile of the aircraft from cruise altitude down to the aircraft destination. The flight plan data supplied by the flight plan data source 106 and processed by the processor 104 to determine the optimized aircraft energy level may vary. In the depicted embodiment, however, the flight plan data includes at least optimized aircraft speeds and optimized aircraft altitudes along the descent profile.

Figure 2:
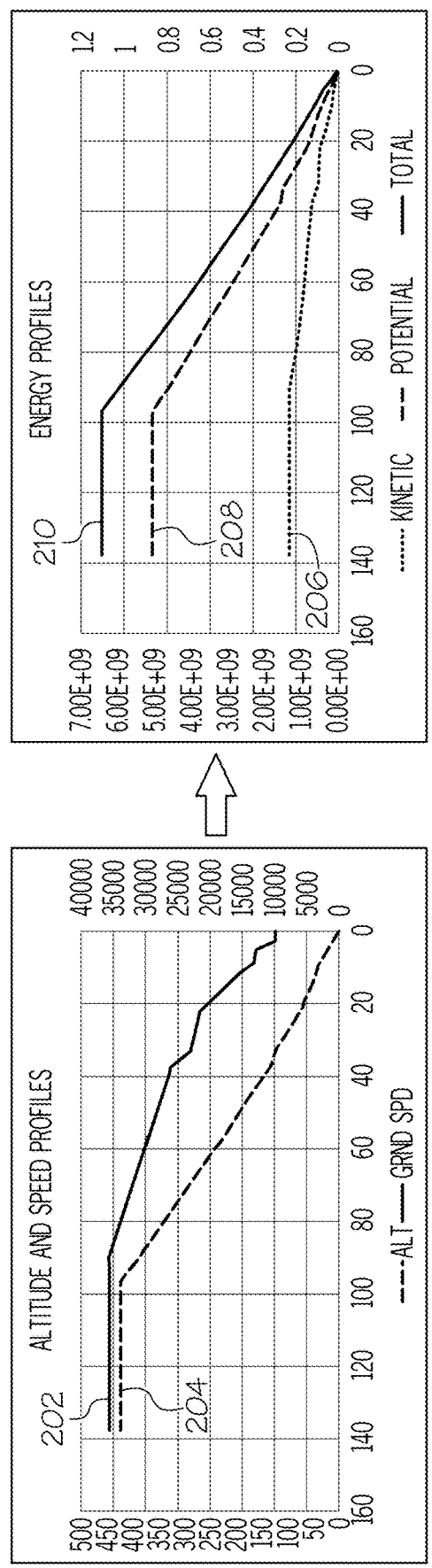
FIG. 2 graphically depicts a method, which may be implemented in the system of FIG. 1, for deriving an optimized aircraft energy level.

As shown more clearly in FIG. 2, the processor 104 processes the optimized aircraft speeds 202 and the optimized aircraft altitudes 204 along the descent profile to determine the optimized aircraft energy level along the descent profile. More specifically, the processor 104 processes the optimized aircraft speeds 202 along the descent profile to determine the optimized aircraft kinetic energy 206 along the descent profile, and processes the optimized aircraft altitudes 204 along the descent profile to determine the optimized aircraft potential energy levels 208 along the descent profile. The processor 104 then sums the optimized kinetic energy levels and the optimized potential energy levels to determine the total aircraft energy, which is the optimized aircraft energy level 210, along the descent profile.

Returning to FIG. 1, the processor 104 is also coupled to receive aircraft data from the aircraft data source 108 and is configured, upon receipt of these data, to continuously process the aircraft data to thereby continuously determine, in real-time, the actual aircraft energy level. The aircraft data supplied by the aircraft data source may vary. In the depicted embodiment, however, the aircraft data include at least sensed aircraft speed and sensed aircraft altitude. Thus, processor 104, at least in the depicted embodiment, is configured to continuously process the sensed aircraft speed to determine the actual aircraft kinetic energy level, and to continuously process the sensed aircraft altitude to determine the actual aircraft potential energy level. The processor 104 is additionally configured to continuously sum the actual aircraft kinetic energy level and the actual aircraft potential energy level to determine the actual aircraft energy level.

Before proceeding further, it is noted that the flight plan data source 106 and the aircraft data sources 106 may be variously implemented. For example, in one embodiment, the flight plan data source 106 is implemented using a flight management system (FMS). In one exemplary embodiment, the aircraft data source 108 includes one or more aircraft speed sensors 112 and one or more aircraft altitude sensors 114. The speed sensors 112, which may be implemented using any one of numerous know speed sensors, are each configured to sense aircraft speed and supply an aircraft speed signal representative thereof to the processor 104. The aircraft altitude sensors 114, which may be implemented using any one of numerous know altitude sensors, are each configured to sense aircraft altitude and supply an aircraft altitude signal representative thereof to the processor 104.

It should additionally be noted that the processor 104 may be implemented using any one (or a plurality) of numerous known general-purpose microprocessors or application specific processor(s) that operates in response to program instructions. Moreover, the processor 104 may be implemented using various other circuits, not just a programmable processor. For example, digital logic circuits and analog signal processing circuits could also be used. In this respect, the processor 104 may include or cooperate with any number of software programs (e.g., avionics display programs) or instructions designed to carry out various methods, process tasks, calculations, and control/display functions described below.

Regardless of how the processor 104, the flight plan data source 106, and the aircraft data source 108 are specifically implemented, the processor 104 is additionally configured to continuously compare the actual aircraft energy level of the aircraft to the optimized aircraft energy level. Based at least in part on this comparison, the processor 104 supplies image rendering display commands to the display device 102 that causes the display device 102 to render at least the image 110 depicted in FIG. 1.

The rendered image 110 indicates the optimized aircraft energy level 116, as determined by the processor 102, preferably using the methodology described above. The rendered image 110 also indicates how the actual aircraft energy level differs from the optimized aircraft energy level 118, and how the actual aircraft energy level is trending relative to the optimized aircraft energy level 122, by preferably comparing, as described above, the actual aircraft energy level of the aircraft to the optimized aircraft energy level. In the depicted embodiment the image 110 is rendered in the form of a numbered energy scale, with the optimized aircraft energy level 116 in the middle (e.g., at "0"), with over-energy conditions and under-energy conditions to the left and right, respectively, of the middle position. The relative amount by which the actual aircraft energy level differs from the optimized aircraft energy level is indicated by increasing magnitude positive numbers for over-energy, and by increasing magnitude negative numbers for under-energy. In the depicted embodiment, the numbers increase in magnitude to a maximum value of 10 (e.g., +10 and −10). It will be appreciated that other numbering schemes may be used and, in some embodiments, numbers may not be used at all.

In addition to the numbered scale, the rendered image may also use varying colors and shades to depict whether the actual aircraft energy level is at, near, or differs from the optimized aircraft energy level 116. For ease of illustration, the image 110 is depicted herein using grey scale. However, in one particular embodiment, the optimized aircraft energy level 116 is rendered in a green color. As the actual aircraft energy level 118 deviates from the optimum 116, the shade of green varies and fades into other colors. For example, as the actual energy level 118 deviates more and more toward an over-energy condition, the color fades from green into yellow, and then from yellow into red. As the actual energy level 118 deviates more and more toward an under-energy condition, the color fades from green into blue, and then from blue into indigo. It will be appreciated that this color scheme may vary, and that in some embodiments colors may not be used altogether.

Figure 3:
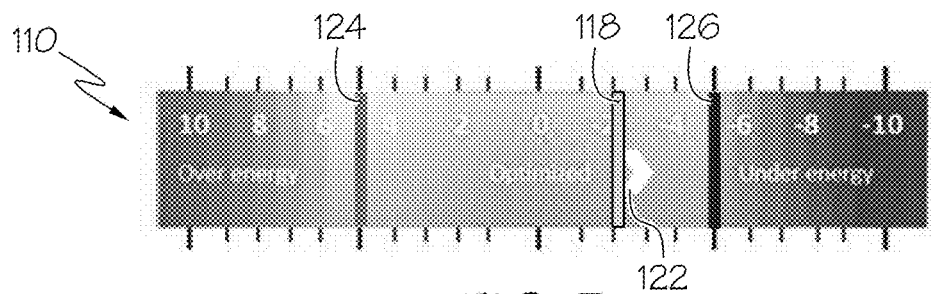
FIGS. 3-7 depict various examples of how an optimized aircraft energy level may be rendered.
Figure 4:
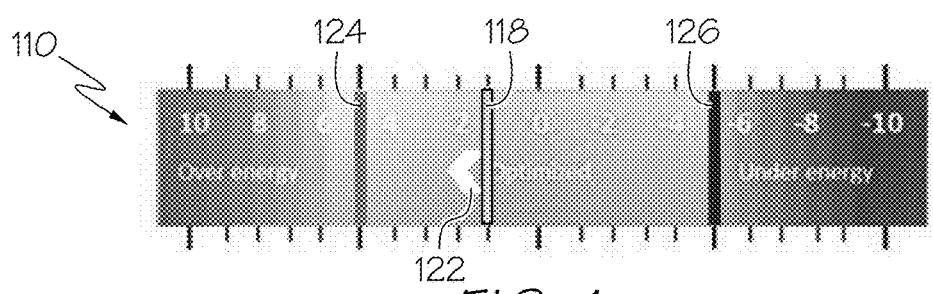
Figure 5:
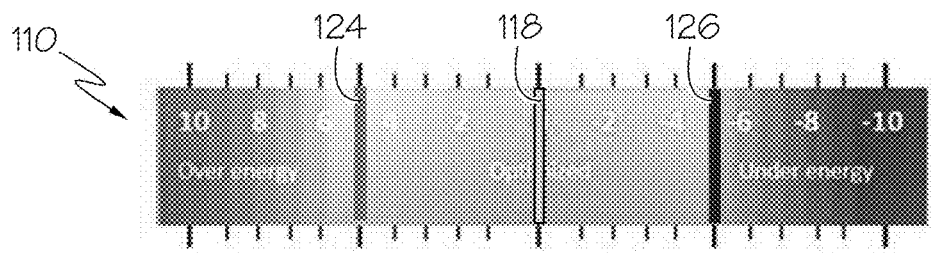
Figure 6:
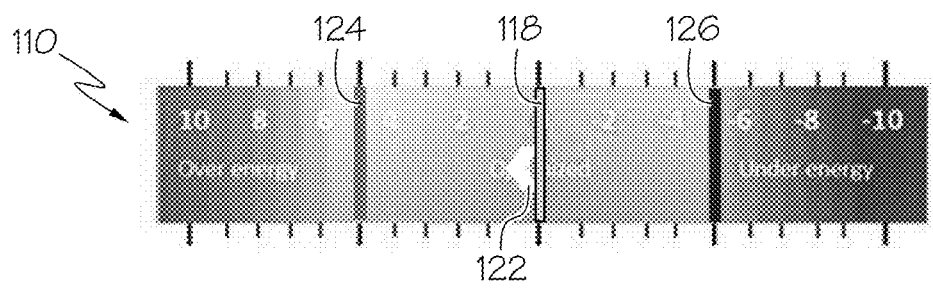
Figure 7:
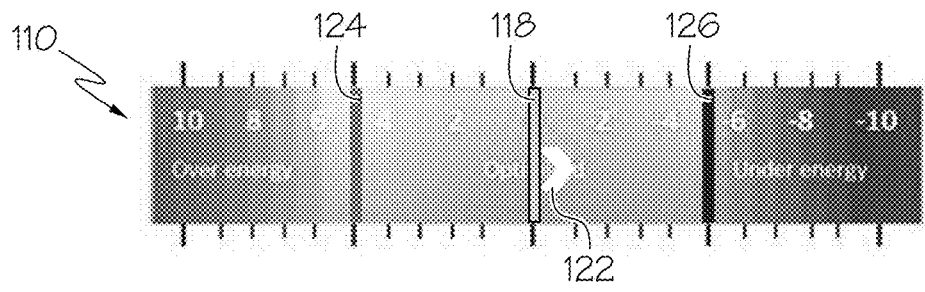

The manner in which the rendered image 110 indicates how the actual aircraft energy level 118 is trending relative to the optimized aircraft energy level 122 may also vary. In FIG. 1 the actual energy level 118 and two arrows 122 are rendered on the under-energy side of optimum, which indicates that the actual energy level 118 is below the optimized aircraft energy level 116 and is rapidly trending in that direction. In other examples, such as depicted in FIG. 3, the actual energy level 118 and a single arrow 122 are rendered on the under-energy side of optimum, which indicates that the actual energy level 118 is below the optimized aircraft energy level 116 but is trending in that direction relatively slower than in FIG. 1. As FIG. 4 depicts, the actual energy level 118 and a single arrow 122 are rendered on the over-energy side of the optimized aircraft energy level 116, which indicates that the actual energy level 118 is above the optimized aircraft energy level 116 and is trending in that direction relatively slowly. When, as depicted in FIG. 5, the actual energy level 118 is at (or close to) the optimized aircraft energy level, with no trend arrows 122, if the actual energy level 118 begins to deviate from this condition, above or below the optimized aircraft energy level 116, then one or more arrows 122 indicating the trend will be depicted, as illustrated in FIGS. 6 and 7.

The rendered image 110 may also, in some embodiments, include indicia of one or more thresholds to indicate when corrective action should (or could) be taken. For example, in the embodiment depicted in FIG. 1, the rendered image 110 includes two indicia—an over-energy threshold 124 and an under-energy threshold 126. It will be appreciated that the number of over-energy and/or under-energy thresholds 124, 126 included in the rendered image 110 may vary, and the corrective action associated with each may also vary. For example, in some embodiments, such as the ones depicted in FIGS. 9-15, which will be described in more detail further below, the rendered image 110 may include a first over-energy threshold 124-1 to indicate when the aircraft airbrakes should be extended by ¼, a second over-energy threshold 124-2 to indicate when the aircraft airbrakes should be extended by ½, etc. Moreover, the under-energy threshold 126 may be used to indicate, for example, when the airbrakes, if extended, should be retracted.

The rendered image 110 may also be based on a determined criticality level. For example, the descent profile may include one or more flight path constraints, such as altitude constraints, speed constraints, required time of arrival (RTA) constraints, path capture constraints, just to name a few. Thus, the processor 104 may additionally be configured to process the flight plan data to detect one or more flight path constraints along the descent profile, and to determine a criticality level associated with the flight path constraints. The criticality level may be determined based, for example, on the likelihood of the aircraft meeting the one or more flight constraints at the current actual aircraft energy. The image rendering display commands supplied to the display device 102 result in the image 110 being rendered based additionally on the determined criticality level.

To provide an example of the criticality level, it may be assumed, for example, that the descent profile includes an altitude constraint. If the actual aircraft energy 118 exceeds the optimized aircraft energy level 116 to meet the altitude constraint, the image 110 may be rendered with appropriate indicia 118, 122, 124 on the over-energy side of the scale.

However, the relative amount illustrated on the over-energy scale may be based on the determined criticality level. For example, for a given actual aircraft energy, the greater distance the aircraft is from the altitude constraint, the lower the criticality level will be, and the indicia 118, 122, 124 will be rendered at a lower number on the over-energy side of the scale. Conversely, the lower the distance to the constraint, the higher the criticality level will be, and the indicia 118, 122, 124 will be rendered at a higher number on the over-energy side of the scale.

Figure 8:
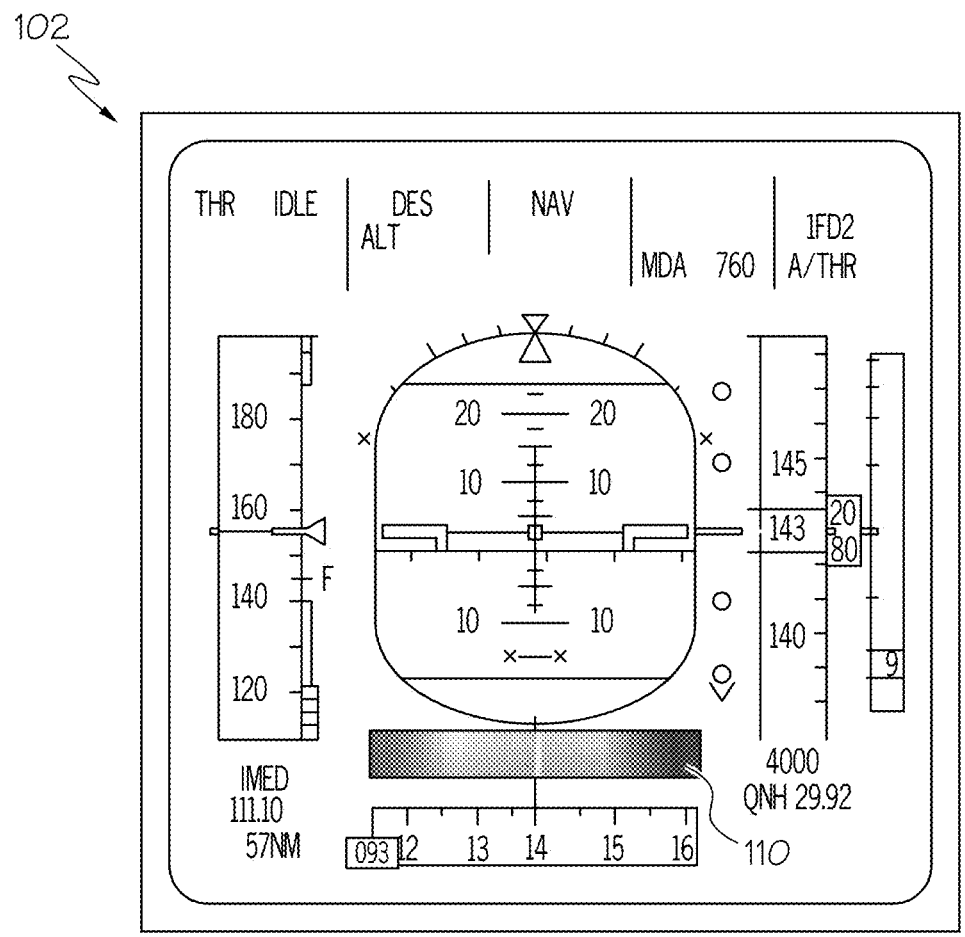
FIG. 8 depicts one example embodiment of a display device that may be implemented in the system of FIG. 1 and used to render an optimized aircraft energy level.

It was previously noted that the display device 102 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display. For completeness, an embodiment in which the display device 102 implements a PFD, and on which the image 110 is rendered, is depicted in FIG. 8.

Referring back to FIG. 1, it is noted that the processor 104 may also be configured to implement additional functions. For example, the processor 104 may be additionally configured to supply image rendering display commands to the display device 102 that cause the display device 102 to render one or more visual cues 128. The visual cues 128 may vary, but are used to indicate actions the flight crew could take to converge the actual aircraft energy level toward the optimized aircraft energy level. For example, the visual cues 128 may indicate, either graphically or textually, that the flight crew should lower flaps, extend airbrakes, increase speed, and/or lower altitude, just to name a few actions. The commands supplied by the processor 104 to the display device 102, in response to the corrective actions taken, may also vary. For example, the processor 104 may supply commands that cause a jump in the indicated actual energy level 118, or commands that cause a gradual drift in the indicated actual energy level 118. Each of these different implementations will now be described in more detail.

Figure 9:
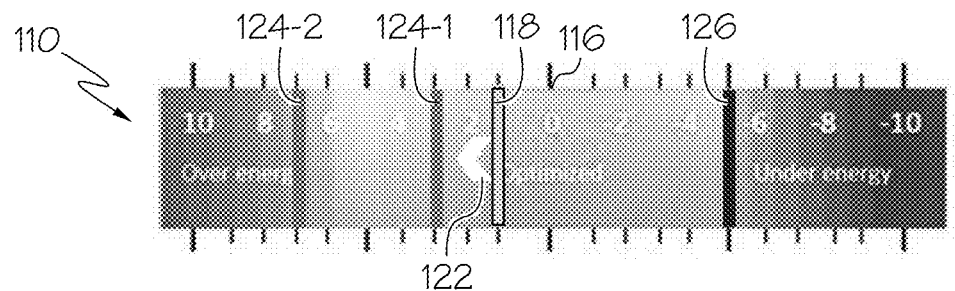
FIGS. 9-12 depict one example embodiment of how the rendered image of FIGS. 3-7 may be rendered in response to corrective actions.

Referring first to FIGS. 9-12, the embodiment in which the processor 104 supplies commands that cause a jump in the indicated actual energy level 118 will be described. In doing so, it is assumed that the aircraft is in an over-energy condition and slowly trending in an increasingly over-energy direction. Thus, as depicted in FIG. 9, the actual energy level 118 and a single arrow 122 are rendered on the over-energy side of the optimized aircraft energy level 116. When the actual energy level 118 reaches either the first over-energy threshold 124-1 (preferable) or the second over-energy threshold 124-2, a visual cue 128 will be rendered (not depicted in FIGS. 9-23) to indicate that the aircraft airbrakes should be extended by ¼ (preferable) or ½ (if the second over-energy threshold 124-2 is reached).

Figure 10:
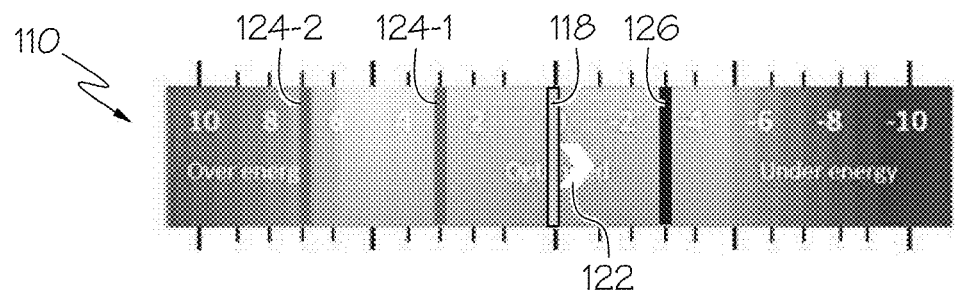
Figure 11:
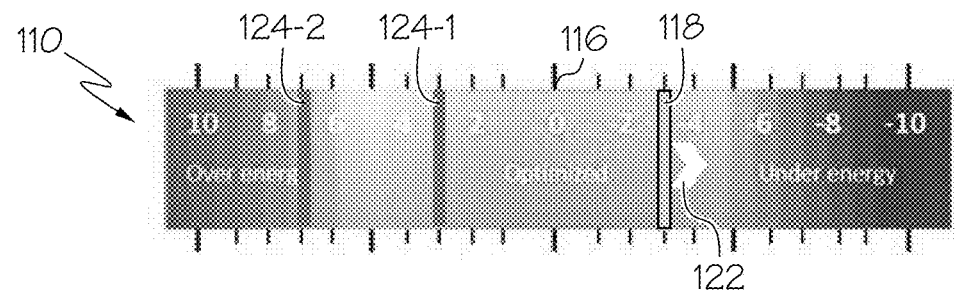

When the airbrakes are appropriately extended, the processor 104 will then command the actual energy level 118 indicator to jump to the optimized aircraft energy level 116. Because the aircraft will slow in response to the airbrakes being extended, the trend arrow 122 will be to the right of the actual energy level 118, and pointing in that direction. This condition is depicted in FIG. 10.

Figure 12:
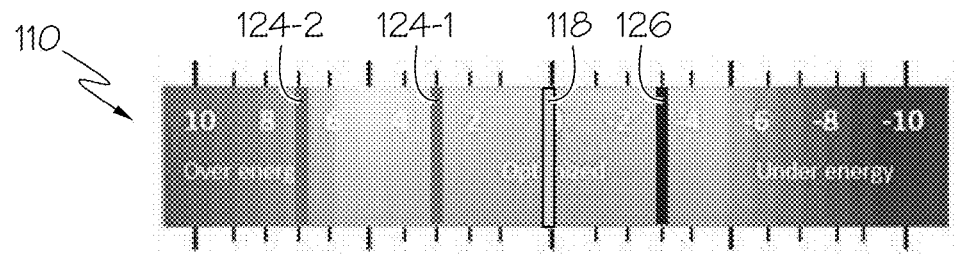

As the aircraft slows further, the actual energy level 118 and trend arrow 122 will move toward the under-energy threshold 126. Then, when the actual energy level 118 reaches the under-energy threshold 126 (FIG. 11), a visual cue 128 will be rendered (not depicted in FIGS. 9-11) to indicate that the aircraft airbrakes should be retracted. Upon retraction, the actual energy level 118 indicator should again jump to the optimized aircraft energy level 116 (FIG. 12).

Figure 13:
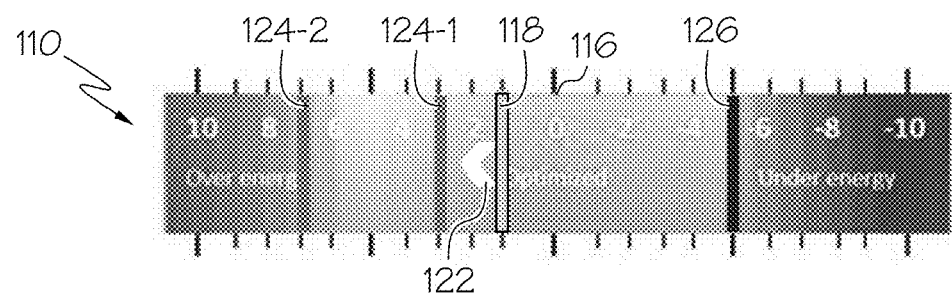
FIGS. 13-15 depict another example embodiment of how the rendered image of FIGS. 3-7 may be rendered in response to corrective actions.
Figure 14:
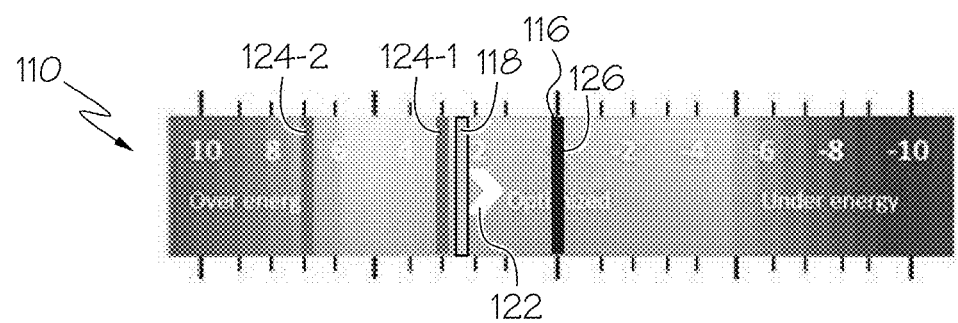
Figure 15:
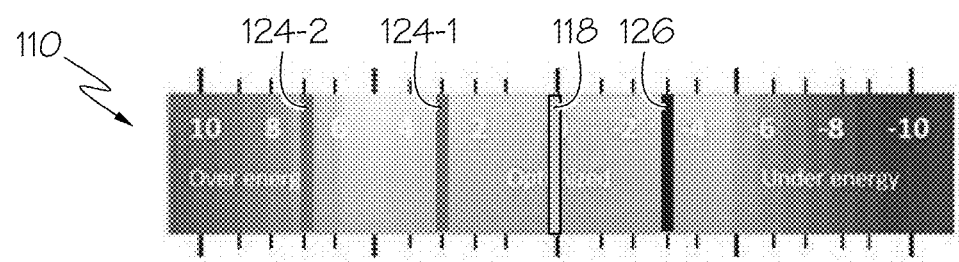

Referring now to FIGS. 13-15, the embodiment in which the processor 104 supplies commands that cause a gradual drift in the indicated actual energy level 118 will be described. In doing so, it is again assumed that the aircraft is in an over-energy condition and slowly trending in an increasingly over-energy direction. Thus, as depicted in FIG. 13, the actual energy level 118 and a single arrow 122 are rendered on the over-energy side of the optimized aircraft energy level 116. When the actual energy level 118 reaches either the first over-energy threshold 124-1 (preferable) or the second over-energy threshold 124-2, a visual cue 128 will be rendered (not depicted in FIGS. 13-15) to indicate that the aircraft airbrakes should be extended by ¼ (preferable) or ½ (if the second over-energy threshold 124-2 is reached).

When the airbrakes are appropriately extended, the processor 104 will not command the actual energy level 118 indicator to jump to the optimized aircraft energy level 116. Rather, the actual energy level 118 indicator and trend arrow 122 will show a return toward the optimized aircraft energy level 116. In addition, the processor 104 will command the under-energy threshold 126 to be rendered at the optimized aircraft energy level 116 (FIG. 14).

As the aircraft slows, the actual energy level 118 and trend arrow 122 will move toward the under-energy threshold 126, which is rendered at the optimized aircraft energy level 116. Thus, when the actual energy level 118 reaches the under-energy threshold 126, a visual cue 128 will be rendered (not depicted in FIGS. 13-15) to indicate that the aircraft airbrakes should be retracted. Upon retraction, the actual energy level 118 indicator should be at the optimized aircraft energy level 116, and the under-energy threshold 126 will jump to its normal threshold level (FIG. 15).

Returning yet again to FIG. 1, in some embodiments, the processor 104 may be additionally configured to supply image rendering display commands to the display device 102 that cause the display device 102 to render one or more alerts 132. These alerts 132, which are preferably rendered when, for example, the actual energy level 118 reaches one of the over-energy or under-energy thresholds 124, 126, may be variously implemented. For example, one or more of the indicia 118, 122, 124 could start blinking, a textual or graphic message could be rendered, an audible message could be generated, or any one of numerous other types of alerts or combinations thereof could be generated.

The processor 104 may also be configured to automatically supply commands to one or more aircraft control systems 134 that will cause the actual aircraft energy level to converge toward the optimized aircraft energy level. For example, the processor 104 may supply commands to appropriate aircraft control systems 134 that will result in lowering of flaps, extending of speed brakes, increasing speed, and/or lowering altitude, just to name a few actions. As may be appreciated, in such embodiments, the commands supplied by the processor 104 to the one or more aircraft control systems 134 may be manually overridden.

Figure 16:
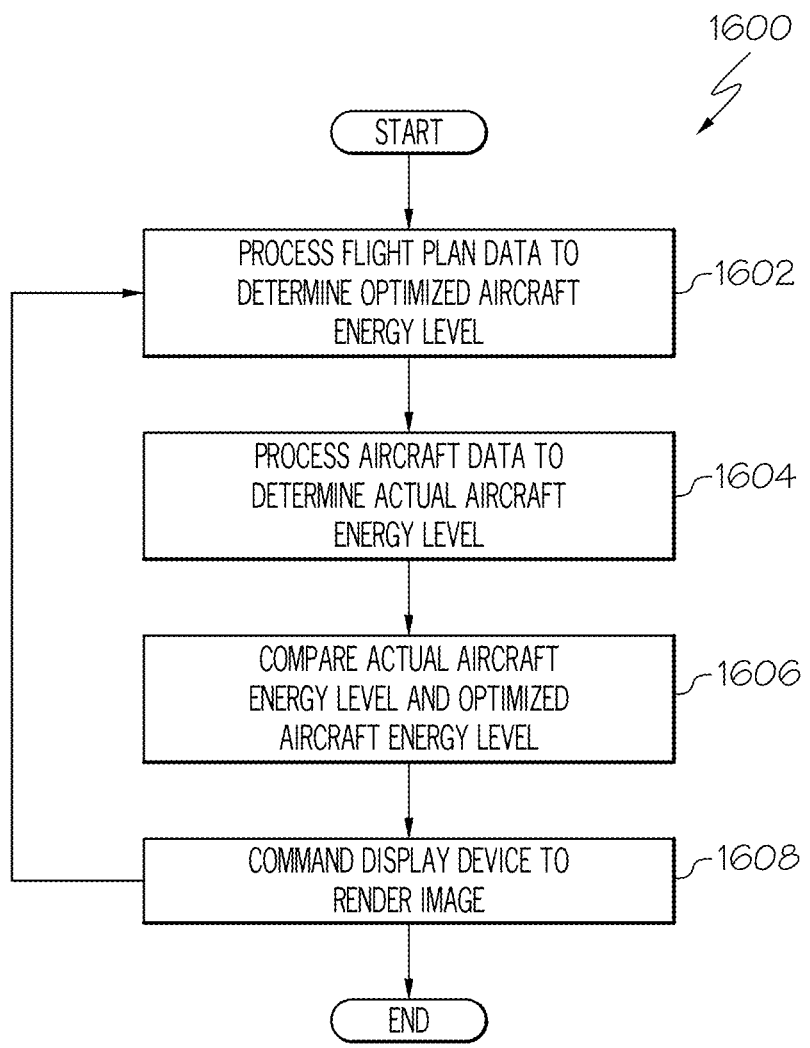
FIG. 16 depicts a process, in flowchart form, that may be implemented by the system in FIG. 1, for displaying optimized aircraft energy level to a flight crew.

Referring now to FIG. 16, the process that the system 100 implements is depicted in flowchart form, and will now be described. In doing so, it is noted that parenthetical numbers refer to like flowchart blocks depicted in FIG. 16. It is seen that the process 1600 begins by processing flight plan data, in the processor 104, to determine the optimized aircraft energy level along a descent profile of the aircraft from cruise altitude down to aircraft destination (1602), and continuously processing aircraft data, in the processor 104, to continuously determine, in real-time, the actual aircraft energy level (1604). The actual aircraft energy level of the aircraft is continuously compared, in the processor 104, to the optimized aircraft energy level (1606). The processor 104 then commands the display device 102 to render the image 110 (1608). As noted above, the rendered image 110 indicates at least: (i) the optimized aircraft energy level, (ii) how the actual aircraft energy level differs from the optimized aircraft energy level, and (iii) how the actual aircraft energy level is trending relative to the optimized aircraft energy level. As also noted above, the rendered image 110 may also be based on the above-described determined criticality level, and may include the over-energy and/or under-energy thresholds 124, 126.

The system and method described herein determine the aircraft optimal energy level during a descent from cruise altitude down to final destination and provides an image to the flight crew that indicates when the actual aircraft energy level deviates from the optimal aircraft energy level during the descent.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying optimized aircraft energy level to a flight crew, the method comprising the steps of:
   processing flight plan data, in a processor, to determine the optimized aircraft energy level along a descent profile of the aircraft from cruise altitude down to aircraft destination;
   continuously processing aircraft data, in the processor, to continuously determine, in real-time, an actual aircraft energy level;
   continuously comparing, in the processor, the actual aircraft energy level of the aircraft to the optimized aircraft energy level; and
   commanding, using the processor, a display device to render an image that indicates:
   (i) the optimized aircraft energy level,
   (ii) how the actual aircraft energy level differs from the optimized aircraft energy level, and (iii) how the actual aircraft energy level is trending relative to the optimized aircraft energy level,
wherein:
the image is rendered as a numbered energy scale having a middle position, a left end, and a right end,
a "0" is rendered at the middle position and represents the optimized aircraft energy level,
increasing magnitude positive numbers are rendered left of the middle position to indicate a relative amount by which the aircraft actual energy level differs from the optimized aircraft energy level in an over-energy condition, and
increasing magnitude negative numbers are rendered right of the middle position to indicate a relative amount by which the aircraft actual energy level differs from the optimized aircraft energy level in an under-energy condition.

2. The method of claim 1, further comprising:
commanding, using the processor, the display device to render indicia of one or more thresholds to indicate when corrective action at least could be taken to correct how the actual aircraft energy level is trending relative to the optimized aircraft energy level.

3. The method of claim 2, further comprising:
commanding, using the processor, the display device to render one or more alerts when the actual aircraft energy level reaches the one or more thresholds.

4. The method of claim 1, further comprising:
determining, in the processor, one or more flight path constraints along the descent profile; and
determining, in the processor, a criticality level based on a likelihood of the aircraft meeting the one or more flight constraints at the actual aircraft energy; and
commanding, using the processor, the display device to render the image based on the determined criticality level and how the determined criticality level is trending.

5. The method of claim 1, wherein the step of processing the flight plan data comprises:
processing optimized aircraft speeds along the descent profile to determine optimized aircraft kinetic energy levels along the descent profile;
processing optimized aircraft altitudes along the descent profile to determine optimized aircraft potential energy levels along the descent profile; and
summing the optimized kinetic energy levels and the optimized potential energy levels to determine the optimized aircraft energy level along the descent profile.

6. The method of claim 1, further comprising:
continuously determining, in the processor, actual aircraft kinetic energy level and actual aircraft potential energy level; and
continuously summing the actual aircraft kinetic energy level and the actual aircraft potential energy level to determine the actual aircraft energy level.

7. The method of claim 6, further comprising:
sensing aircraft speed;
sensing aircraft altitude;
continuously processing the sensed aircraft speed, in the processor, to determine the actual aircraft kinetic energy level; and
continuously processing the sensed aircraft altitude, in the processor, to determine the actual aircraft potential energy level.

8. The method of claim 1, further comprising:
commanding, using the processor, the display device to render one or more visual cues that indicate actions the flight crew could take to converge the actual aircraft energy level toward the optimized aircraft energy level.

9. The method of claim 1, further comprising:
automatically supplying commands, using the processor, to one or more aircraft control systems that will cause the actual aircraft energy level to converge toward the optimized aircraft energy level.

10. A system for displaying optimized aircraft energy level to a flight crew, comprising:
a display device coupled to receive image rendering display commands and configured, upon receipt thereof, to render various images; and
a processor coupled to receive flight plan data and aircraft data and configured to:
process the flight plan data to determine the optimized aircraft energy level along a descent profile of the aircraft from cruise altitude down to aircraft destination,
continuously process the aircraft data to continuously determine, in real-time, an actual aircraft energy level,
continuously compare the actual aircraft energy level of the aircraft to the optimized aircraft energy level, and
supply image rendering display commands to the display device that cause the display device to render an image that indicates (i) the optimized aircraft energy level, (ii) how the actual aircraft energy level differs from the optimized aircraft energy level, and (iii) how the actual aircraft energy level is trending relative to the optimized aircraft energy level,
wherein:
the image is rendered as a numbered energy scale having a middle position, a left end, and a right end,
a "0" is rendered at the middle position and represents the optimized aircraft energy level,
increasing magnitude positive numbers are rendered left of the middle position to indicate a relative amount by which the aircraft actual energy level differs from the optimized aircraft energy level in an over-energy condition, and
increasing magnitude negative numbers are rendered right of the middle position to indicate a relative amount by which the aircraft actual energy level differs from the optimized aircraft energy level in an under-energy condition.

11. The system of claim 10, wherein the processor is further configured to command the display device to render indicia of one or more thresholds to indicate when corrective action at least could be taken to correct how the actual aircraft energy level is trending relative to the optimized aircraft energy level.

12. The system of claim 10, wherein the processor is further configured to command the display device to render one or more alerts when the actual aircraft energy level reaches the one or more thresholds.

13. The system of claim 10, wherein the processor is further configured to:
process the flight plan data to detect one or more flight path constraints along the descent profile;
determine a criticality level based on a likelihood of the aircraft meeting the one or more flight constraints at the actual aircraft energy; and supply the image rendering display commands to the display device that cause the display device to render the image based on the determined criticality level.

14. The system of claim 10, wherein the processor is further configured to:
process optimized aircraft speeds along the descent profile to determine optimized aircraft kinetic energy levels along the descent profile;
process optimized aircraft altitudes along the descent profile to determine optimized aircraft potential energy levels along the descent profile; and
sum the optimized kinetic energy levels and the optimized potential energy levels to determine the optimized aircraft energy level along the descent profile.

15. The system of claim 10, wherein the processor is further configured to:
continuously determine actual aircraft kinetic energy level and actual aircraft potential energy level; and
continuously sum the actual aircraft kinetic energy level and the actual aircraft potential energy level to determine the actual aircraft energy level.

16. The system of claim 15, further comprising:
an aircraft speed sensor configured to sense aircraft speed and supply an aircraft speed signal representative thereof;
an aircraft altitude sensor configured to sense aircraft altitude and supply an aircraft altitude signal representative thereof,
wherein the processor is coupled to receive the aircraft speed signal and the aircraft altitude signal and is further configured to:
continuously process the sensed aircraft speed to determine the actual aircraft kinetic energy level, and
continuously process the sensed aircraft altitude to determine the actual aircraft potential energy level.

17. The system of claim 10, wherein the processor is further configured to supply image rendering display commands to the display device that cause the display device to render one or more visual cues that indicate actions the flight crew could take to converge the actual aircraft energy level toward the optimized aircraft energy level.

18. The system of claim 10, wherein the processor is further configured to automatically supply commands to one or more aircraft control systems that will cause the actual aircraft energy level to converge toward the optimized aircraft energy level.

19. A system for displaying optimized aircraft energy level to a flight crew, comprising:
an aircraft speed sensor configured to sense aircraft speed and supply an aircraft speed signal representative thereof;
an aircraft altitude sensor configured to sense aircraft altitude and supply an aircraft altitude signal representative thereof,
a display device coupled to receive image rendering display commands and configured, upon receipt thereof, to render various images; and
a processor coupled to receive flight plan data, the aircraft speed signal, and the aircraft altitude signal, the processor configured to:
process the flight plan data to determine the optimized aircraft energy level along a descent profile of the aircraft from cruise altitude down to aircraft destination,
continuously process the sensed aircraft speed to determine the actual aircraft kinetic energy level,
continuously process the sensed aircraft altitude to determine the actual aircraft potential energy level
continuously compare the actual aircraft energy level of the aircraft to the optimized aircraft energy level,
continuously sum the actual aircraft kinetic energy level and the actual aircraft potential energy level to determine the actual aircraft energy level, and
supply image rendering display commands to the display device that cause the display device to:
render an image that indicates (i) the optimized aircraft energy level, (ii) how the actual aircraft energy level differs from the optimized aircraft energy level, and (iii) how the actual aircraft energy level is trending relative to the optimized aircraft energy level, and
render one or more visual cues that indicate actions the flight crew could take to converge the actual aircraft energy level toward the optimized aircraft energy level,
wherein:
the image is rendered as a numbered energy scale having a middle position, a left end, and a right end,
a "0" is rendered at the middle position and represents the optimized aircraft energy level,
increasing magnitude positive numbers are rendered left of the middle position to indicate a relative amount by which the aircraft actual energy level differs from the optimized aircraft energy level in an over-energy condition, and
increasing magnitude negative numbers are rendered right of the middle position to indicate a relative amount by which the aircraft actual energy level differs from the optimized aircraft energy level in an under-energy condition.

20. The system of claim 19, wherein the processor is further configured to:
process the flight plan data to detect one or more flight path constraints along the descent profile;
determine a criticality level based on a likelihood of the aircraft meeting the one or more flight constraints at the actual aircraft energy;
supply the image rendering display commands to the display device that cause the display device to render the image based on the determined criticality level;
process optimized aircraft speeds along the descent profile to determine optimized aircraft kinetic energy levels along the descent profile;
process optimized aircraft altitudes along the descent profile to determine optimized aircraft potential energy levels along the descent profile; and
sum the optimized kinetic energy levels and the optimized potential energy levels to determine the optimized aircraft energy level along the descent profile.

* * * * *